United States Patent
Draaijer et al.

(10) Patent No.: US 12,218,704 B2
(45) Date of Patent: Feb. 4, 2025

(54) OPTICAL ALIGNMENT SYSTEM FOR OPTICAL COMMUNICATION DEVICES

(71) Applicant: SIGNIFY HOLDING B.V., Eindhoven (NL)

(72) Inventors: Maurice Herman Johan Draaijer, Ittervoort (NL); Jan Ekkel, Oss (NL); Harry Broers, 's-Hertogenbosch (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 191 days.

(21) Appl. No.: 18/017,719

(22) PCT Filed: Jul. 16, 2021

(86) PCT No.: PCT/EP2021/069998
§ 371 (c)(1),
(2) Date: Jan. 24, 2023

(87) PCT Pub. No.: WO2022/023081
PCT Pub. Date: Feb. 3, 2022

(65) Prior Publication Data
US 2023/0275661 A1    Aug. 31, 2023

(30) Foreign Application Priority Data
Jul. 28, 2020    (EP) .................................. 20188028

(51) Int. Cl.
*H04B 10/116*    (2013.01)
*H04B 10/112*    (2013.01)
*H04B 10/67*    (2013.01)

(52) U.S. Cl.
CPC ......... *H04B 10/116* (2013.01); *H04B 10/112* (2013.01); *H04B 10/67* (2013.01)

(58) Field of Classification Search
CPC ...... H04B 10/116; H04B 10/112; H04B 10/67
(Continued)

(56) References Cited

U.S. PATENT DOCUMENTS

| 6,381,055 B1 * | 4/2002 | Javitt ................. H04B 10/1123 398/131 |
| 6,768,876 B1 | 7/2004 | Steiger et al. |

(Continued)

FOREIGN PATENT DOCUMENTS

WO    WO-2023244115 A1 *  12/2023  ......... H04B 10/1143

OTHER PUBLICATIONS

Peng Deng et al., "MEMS-Based Beam-Steerable FSO Communications for Reconfigurable Wireless Data Center", Proceedings Paper, Jan. 28, 2017, 9 pages, Proc. SPIE 10128, Broadband Access Communication Technologies XI, 1012805 (Jan. 28, 2017); doi: 10.1117/12.2253342. https://spie.org/Publications/Proceedings/Paper/10.1117/12.22533427pr—Abstract.

*Primary Examiner* — Abbas H Alagheband (57) ABSTRACT

A method and optical system for preemptively correcting a potential future misalignment of an optical communication beam between a plurality of free space optical (FSO) units or Light Fidelity (Li-Fi) units by intentionally generating predetermined and repetitive motions of the beam path between the units using an adjustment mechanism. In some examples the predetermined motion is a circular motion or a reciprocating and/or translating motion. The predetermined motions can be implemented by an adjustment mechanism which can include a plurality of piezoelectric actuators or one or more MEMS controlled mirrors or micro-lenses.

15 Claims, 9 Drawing Sheets

(58) Field of Classification Search
USPC .......................................................... 398/172
See application file for complete search history.

(56) References Cited

U.S. PATENT DOCUMENTS

| | | | | |
|---|---|---|---|---|
| 11,632,173 | B2 * | 4/2023 | Arulandu | H04B 10/11 |
| | | | | 398/118 |
| 11,711,145 | B2 * | 7/2023 | Ekkel | H04B 10/112 |
| | | | | 398/118 |
| 2009/0310784 | A1 * | 12/2009 | Duligall | H04L 9/0852 |
| | | | | 380/278 |
| 2014/0241731 | A1 * | 8/2014 | Peach | H04B 10/11 |
| | | | | 398/139 |
| 2015/0139585 | A1 * | 5/2015 | Graves | G02B 6/3588 |
| | | | | 385/18 |
| 2019/0372667 | A1 | 12/2019 | Momtahan et al. | |
| 2021/0075509 | A1 * | 3/2021 | Draaijer | H04B 10/118 |
| 2022/0140901 | A1 * | 5/2022 | Arulandu | H04B 10/11 |
| | | | | 398/118 |
| 2022/0166504 | A1 * | 5/2022 | Ekkel | H04B 10/112 |
| 2023/0275660 | A1 * | 8/2023 | Wendt | H04B 10/116 |
| | | | | 398/172 |

* cited by examiner

OPTICAL ALIGNMENT SYSTEM FOR OPTICAL COMMUNICATION DEVICES

CROSS-REFERENCE TO PRIOR APPLICATIONS

This application is the U.S. National Phase application under 35 U.S.C. § 371 of International Application No. PCT/EP2021/069998, filed on Jul. 16, 2021, which claims the benefit of European patent application Ser. No. 20188028.3, filed on Jul. 28, 2020. These applications are hereby incorporated by reference herein.

FIELD OF THE DISCLOSURE

The present disclosure is directed generally to optical systems, specifically to systems and methods for optically preemptively correcting a potential misalignment of an optical beam with respect to a detector.

BACKGROUND

Light-fidelity (Li-Fi) and other free space optical communications rely on direct paths between a source and a target to provide wireless optical communication. Often the source and target are mounted or otherwise secured to an elevated structure to prevent objects, vehicles, or people from interfering with the signal path. Especially in these elevated positions, each unit, i.e., the source and the target are prone to movement or drift with respect to each other due to a variety of factors including, for example, weather, sway caused by wind, and bending due to uneven thermal expansion of the materials used to construct the elevated structures. These environmental conditions may be so severe as to cause a misalignment between the source and target resulting in data loss within the communication.

SUMMARY OF THE DISCLOSURE

The present disclosure is related to methods and systems for preemptively correcting a potential future misalignment of an optical communication beam between a plurality of free space optical (FSO) units or Light Fidelity (Li-Fi) units by intentionally generating predetermined and repetitive motions of the beam path between the units using an adjustment mechanism. For example, inducing small, known, repeating movements to a transmission unit while aligned with a detector portion of a receiving unit such that significant movements or drifts that would ultimately cause a future misalignment can be corrected prior to losing a significant amount of data. In some examples the predetermined motion is a circular motion or a reciprocating and/or translating motion. The predetermined motions can be implemented by an adjustment mechanism which can include a plurality of piezoelectric actuators or one or more MEMS controlled mirrors or micro-lenses.

In one example, a method of maintaining alignment of an optical communication beam is provided, the method including: generating, via a transmission unit, an optical communication beam along an imaginary alignment axis, the transmission unit comprising at least one unit detector, the optical communication beam having a beam path between the transmission unit and a receiving unit, the receiving unit comprising at least one detector portion and at least one reflector portion; receiving at the at least one detector portion of the receiving unit, the optical communication beam; preemptively altering the beam path relative to the imaginary alignment axis, using a predetermined motion; detecting a potential misalignment of the imaginary alignment axis when at least a portion of the optical communication beam is received by the at least one unit detector of the transmission unit; and aligning, using an alignment mechanism, the imaginary alignment axis relative to the center of the at least one detector portion based on the detected misalignment.

In one aspect, the predetermined motion is a circular motion or a reciprocating motion.

In one aspect, the alignment mechanism comprises a plurality of piezoelectric actuators and wherein the plurality of piezoelectric actuators are radially spaced about an external surface of a body of the transmission unit, where each piezoelectric actuator of the plurality of piezoelectric actuators is configured to connect with a portion of the body of the transmission unit and wherein the plurality of piezoelectric actuators are arranged about a rear portion of the transmission unit.

In one aspect, the transmission unit comprises an inertial navigation system to obtain movement information of the transmission unit.

In one aspect, the alignment mechanism comprises at least one micro-electromechanical machine (MEMS) that comprises a mirror or micro-lens; or wherein the alignment mechanism comprises a rotating mass.

In one aspect, the at least one detector portion has a first diameter and the optical communication beam has a second diameter, wherein the first diameter is less than or equal to the second diameter.

In one aspect, the receiving unit further comprises a center reflector portion.

In another example, an optical system is provided, the optical system including a transmission unit configured to generate an optical communication beam along an imaginary alignment axis, the transmission unit comprising at least one unit detector, a receiving unit comprising at least one detector portion and at least one reflector portion, an alignment mechanism configured to preemptively alter a beam path arranged between the transmission unit and the receiving unit, relative to the imaginary alignment axis using a predetermined motion, and a controller configured to detect at least a portion of the optical communication beam at the at least one unit detector and operate the alignment mechanism to preemptively align the imaginary alignment axis relative to a center of the at least one detector portion.

In one aspect, the predetermined motion is a circular motion or a reciprocating motion.

In one aspect, the alignment mechanism comprises a plurality of piezoelectric actuators and wherein the plurality of piezoelectric actuators are radially spaced about an external surface of a rear portion of a body of the transmission unit, where each piezoelectric actuator of the plurality of piezoelectric actuators is configured to engage with a portion of the body of the transmission unit.

In one aspect, the transmission unit comprises an inertial navigation system to obtain movement information of the transmission unit.

In one aspect, the alignment mechanism comprises at least one micro-electromechanical machine (MEMS) that comprises a mirror or micro-lens; or wherein the alignment mechanism comprises a rotating mass.

In one aspect, the at least one detector portion has a first diameter and the optical communication beam has a second diameter, wherein the first diameter is less than or equal to the second diameter.

In one aspect, the receiving unit further comprises a center reflector portion.

In one aspect, the transmission unit is a Light Fidelity (Li-Fi) transmitter and the receiving unit is a Li-Fi receiver.

These and other aspects of the various embodiments will be apparent from and elucidated with reference to the embodiment(s) described hereinafter.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the various embodiments.

DETAILED DESCRIPTION OF EMBODIMENTS

The present disclosure is related to preemptively correcting a potential future misalignment of an optical communication beam between a plurality of free space optical (FSO) units or plurality of Li-Fi units by intentionally generating predetermined and repetitive motions of the beam path between the units using an adjustment mechanism. In some examples the predetermined motion is a circular motion or a reciprocating and/or translating motion. The predetermined motions can be implemented by an adjustment mechanism which can include a plurality of piezoelectric actuators or one or more MEMS controlled mirrors or micro-lenses.

Figure 1:
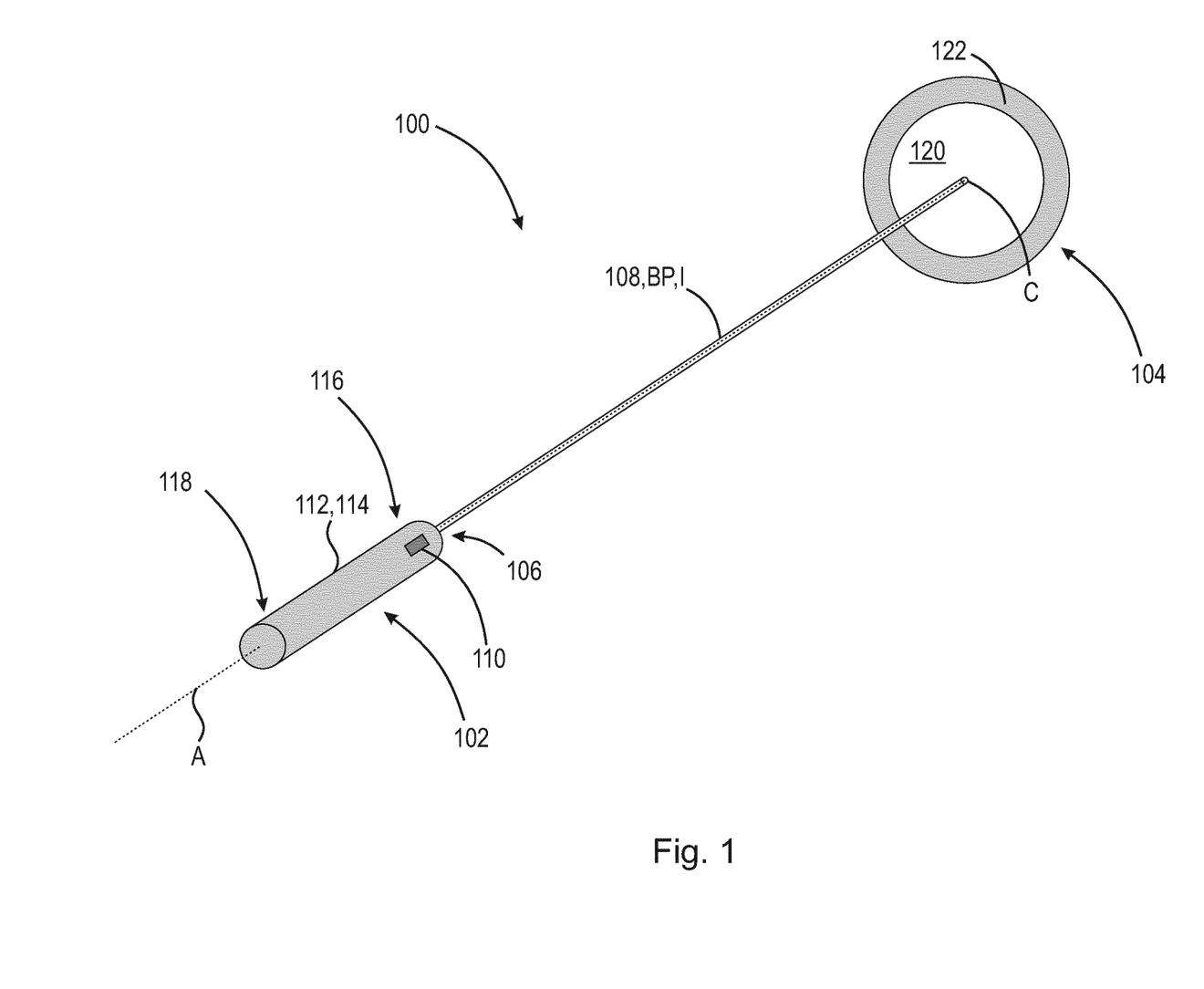
FIG. 1 is a schematic perspective view of an optical system according to the present disclosure.

The following description should be read in view of FIGS. 1-7. FIG. 1 illustrates a schematic perspective view of optical system 100 according to the present disclosure. As illustrated, optical system 100 includes a transmission unit 102 and a receiving unit 104. Transmission unit 102 is intended to be a first free space optical (FSO) unit (discussed below) or a transmitter for Li-Fi based communication systems and receiving unit 104 is intended to be a second FSO unit (discussed below) or a receiver for Li-Fi based communication systems. Although transmission unit 102 and receiving unit 104 are illustrated and described herein as a first free space optical (FSO) unit 102 and a second FSO unit 104, it should be appreciated the following techniques and principles can be utilized between units of a Li-Fi system as well, e.g., between a Li-Fi transmitter and a Li-Fi receiver. As will be discussed below, during operation of optical system 100, first FSO unit 102 and second FSO unit 104 are intended to be mounted or otherwise affixed to a streetlamp, building, tower, or other elevated outdoor structure and separated by open air such that optical communication between each unit is possible. First FSO unit 102 includes an electromagnetic source 106 configured to produce focused electromagnetic radiation along imaginary alignment axis A (hereinafter "alignment axis A"). Electromagnetic source 106 can be selected from a Light-Emitting Diode (LED), Organic LED (OLED), a solid state laser, a gas laser, a liquid laser, a semiconductor laser or any other source of electromagnetic radiation (e.g., electromagnetic radiation in the visible and/or non-visible spectrums) capable of producing focused radiation along alignment axis A. In one example, the electromagnetic radiation produced is radio frequency (RF) radiation In the examples illustrated, electromagnetic source 106 is a semiconductor laser comprising a one or two-dimensional array of optical transmitters configured to produce optical communication beam 108 along beam path BP and/or along alignment axis A. It should be appreciated that electromagnetic source 106 can utilize one or more lenses or one or more micro-lenses to focus the electromagnetic radiation as it leaves first FSO unit 102 and travels along beam path BP. First FSO unit 102 further includes a unit detector 110 configured to receive at least a portion of optical communication beam 108 that has been reflected of second FSO unit 104, as will be discussed below. As will be discussed below in detail, and as illustrated in FIGS. 2-4B, 6, and 7, alignment axis A represents the trajectory of beam path BP when no predetermined motion (e.g., predetermined motion 126 discussed below) is applied to first FSO unit 102 and/or second FSU unit 104. In other words, in the absence of a predetermined motion alignment axis A will be substantially parallel with beam path BP.

Figure 2A:
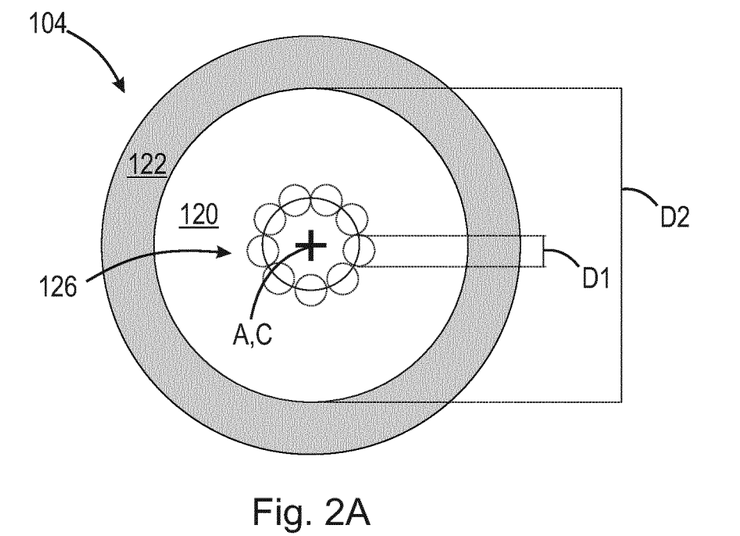
FIG. 2A is a schematic view of a receiving unit according to the present disclosure.
Figure 2B:
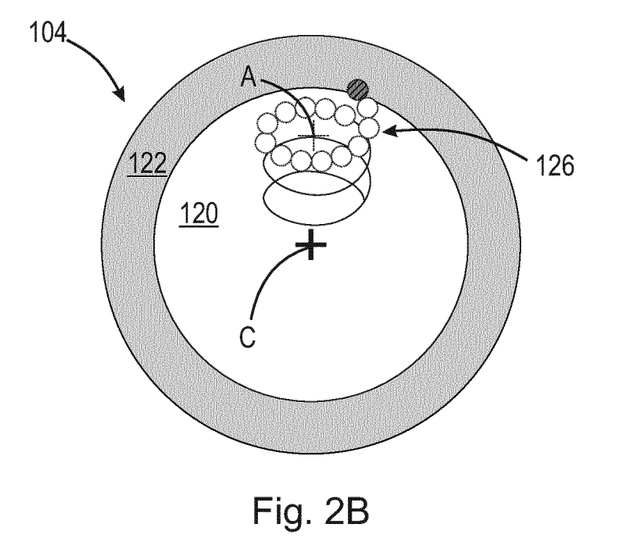
FIG. 2B is a schematic view of a receiving unit according to the present disclosure.

Optical communication beam 108, once focused along beam path BP, has a first diameter D1 (shown in FIG. 2A) and an intensity I. It should be appreciated that in some examples, as will be discussed below, first diameter D1 can be substantially equal to or greater than the diameter of detector portion 120, i.e., second diameter D2 (discussed below and shown in FIG. 4B). However, in some examples, as shown in FIGS. 1-2B, diameter D1 is substantially smaller than detector portion 120 (discussed below). Optical communication beam 108 can be configured and/or focused such that intensity I decreases as a function of radius or distance from the center of optical communication beam 108, e.g., the optical communication beam 108 may have its highest intensity or peak intensity I at the center and have the intensity I decrease or degrade toward the outside of the beam's diameter, i.e., the outside perimeter of D1.

It should be appreciated that any technology or protocol for transmitting data in optical communication beams may be utilized by the first FSO unit 102. For example, optical communication beam 108 may be encoded with information by modulating a carrier signal with a modulating signal that contains the information desired to be transmitted, e.g., information related to predetermined motion 126 (discussed below). Additionally, or in the alternative to signal modulation, the wavelength of optical communication beam 108 can be set outside the visual spectrum if desired, which may enable the second FSO unit 104 (discussed in detail below) to more easily differentiate the optical communication beam 108 from ambient light, and therefore detect the optical communication beam 108. In some example embodiments, optical communication beam 108 is generated having known and measurable characteristics, e.g., a known wavelength outside the visual spectrum and/or modulated with a carrier signal having a set base frequency. In some example embodiments, the wavelength and/or polarization of optical communication beam 108 is altered depending on the time of day to account for changing ambient conditions, e.g., due to the changing light spectrum from the sun or other light sources throughout the day. Furthermore, optical communication beam 108 may be transmitted in a collimated or parallel manner, with little or no divergence, e.g., to facilitate accurate long-range transmission. For example, the emitted optical communication beam 108 can be collimated by optics, e.g., an aspheric lens, to form a collimated light beam or beams that are pointed towards the second FSO unit 104. In other example embodiments, a light torch can be included to focus optical communication beam 108.

Figure 6:
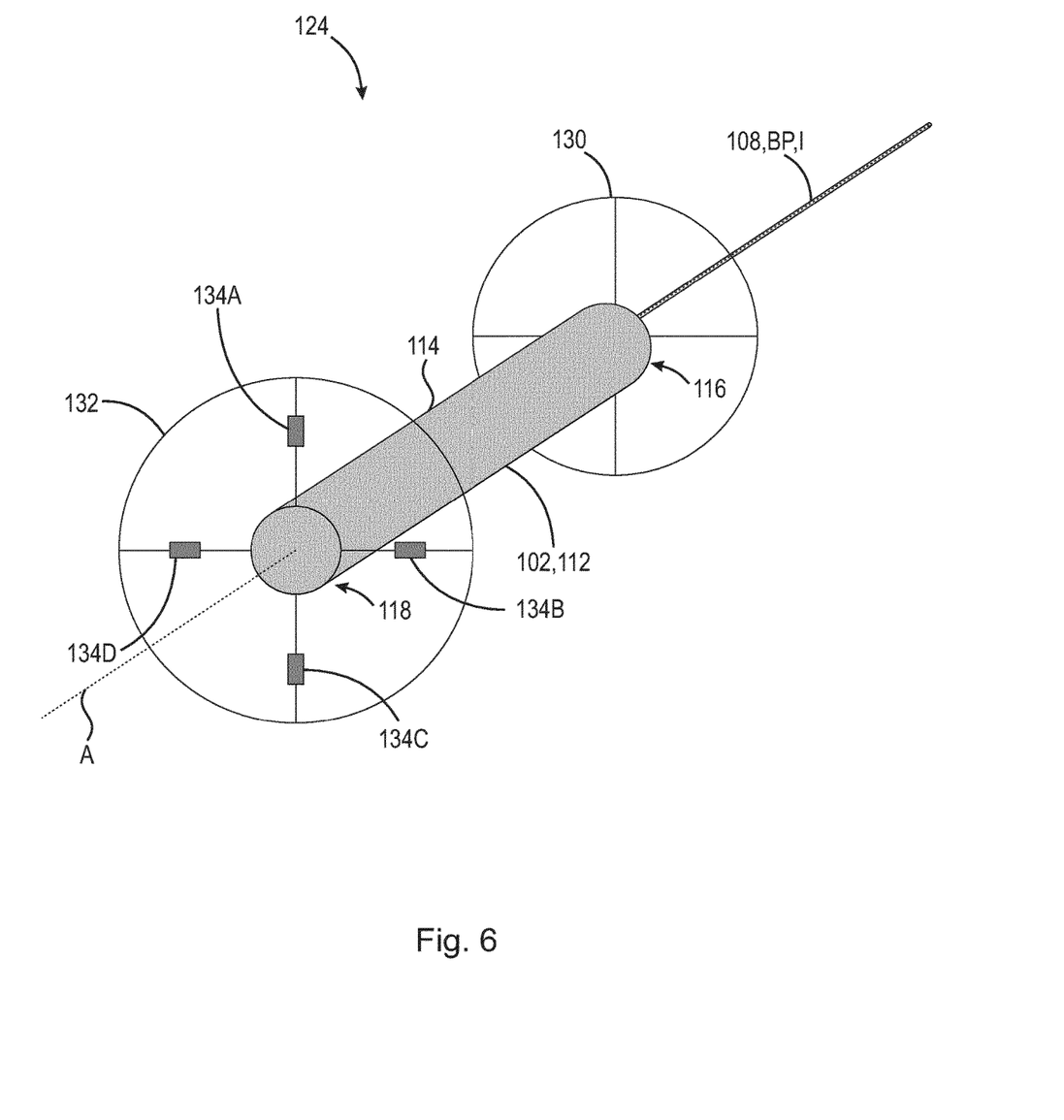
FIG. 6 is a schematic perspective view of an optical system according to the present disclosure.
Figure 7:
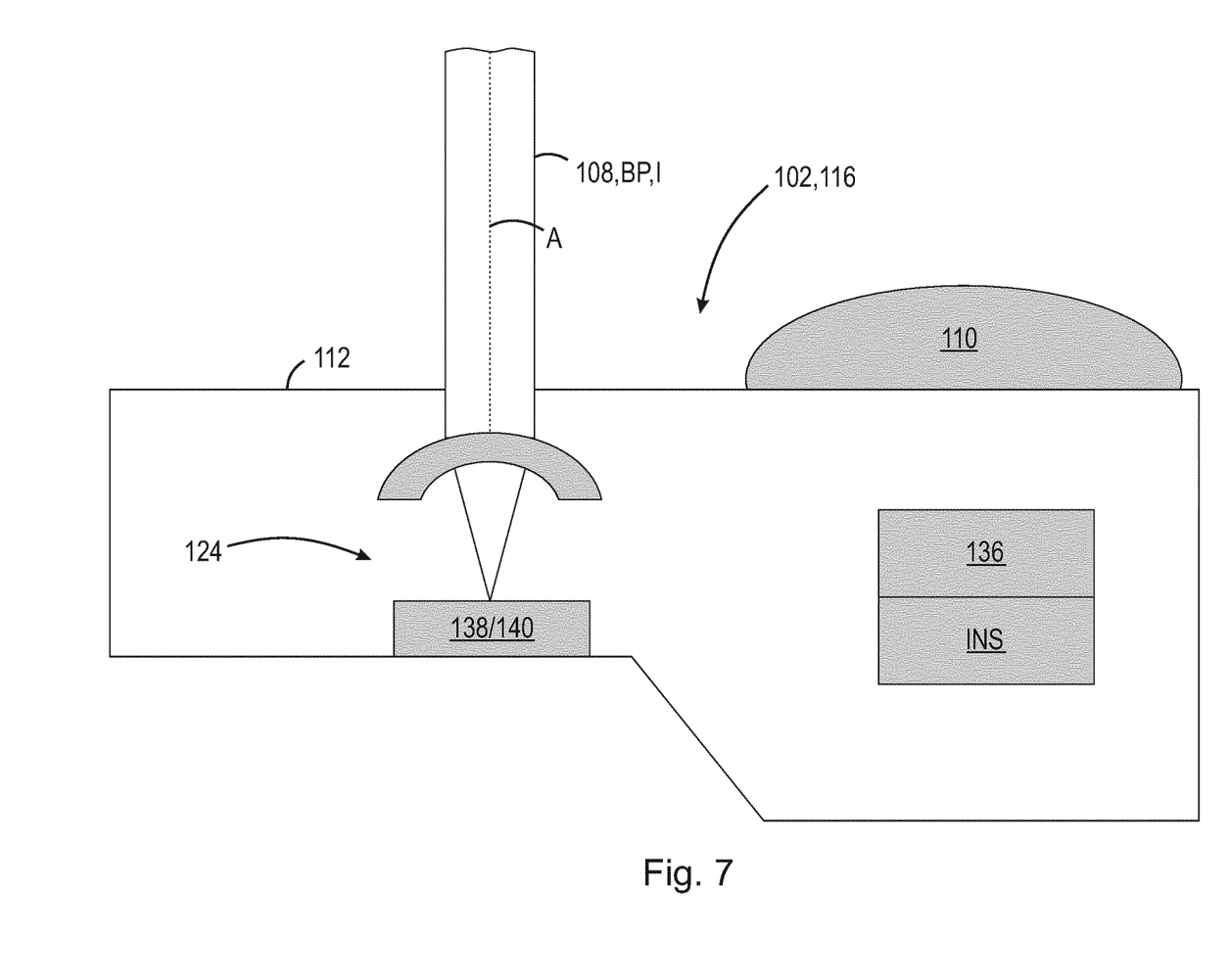
FIG. 7 is a schematic partial cross-sectional view of a transmission unit according to the present disclosure.

As will be discussed below, and as illustrated in FIGS. 1, 6 and 7, first FSO unit 102 can include a body 112 configured to at least partially enclose electromagnetic source 106. Body 112 includes an external surface 114 and has a front portion 116 and a rear portion 118. In one example, as illustrated in FIGS. 1 and 6, external surface 114 is a circumferential surface; however, it should be appreciated that external surface 114 can have any cross-sectional shape including but not limited to: triangular, square, rectangular, hexagonal, octagonal, etc. Front portion 116 is intended to be the portion of body 112 proximate the opening, aperture, or surface of body 112 from which optical communication beam 108 is emitted. In other words, front portion 116 is intended to be the portion of body 112 closest to second FSO unit 104 during operation of optical system 100. Conversely, rear portion 118 is intended to be the portion of body 112 that is farthest from second FSO unit 104 during operation. It should also be appreciated that, although not illustrated, first FSO unit 102 can include first circuitry electrically connecting a first processor and first memory, the first processor and the first memory configured to execute and store, respectively, a first plurality of non-transitory computer-readable instructions to perform the functions of first FSO unit 102 as will be discussed herein. Furthermore, as illustrated and described below in detail with respect to FIGS. 6-7, first FSO unit 102 can further comprise alignment mechanism 124.

Second FSO unit 104 is configured to receive optical communication 108 from first FSO unit 102. As illustrated in FIGS. 1-5B, second FSO unit 104 includes at least one portion configured to receive optical communication beam 108, i.e., detector portion 120, and at least one portion configured to reflect optical communication beam 108, i.e., reflector portion 122. Detector portion 120 is intended to be a photodiode, a plurality of photodiodes, or any other detector or sensor capable of receiving and detecting the modulations in optical communication beam 108. In one example, detector portion 120 can include at least one avalanche photodiode or at least one single-photon avalanche diode. Reflector portion 122 includes a passive reflective component or material or a plurality of passive reflective components or materials, e.g., mirrors or smooth coated surfaces with highly reflective properties. In the examples illustrated in FIGS. 1-5B, both detector portion 120 and reflector portion 122 are circular shaped; however, it should be appreciated that other shapes and combinations of shapes may be utilized. Although reflector portion 122 is reflective or includes reflective parts or materials, it should be understood that the detector portion 120 may reflect a very small portion of the electromagnetic radiation of optical communication beam 108, depending on the chosen wavelength, but is initially intended to be optimized to absorb all light and therefore be non-reflective. For example, reflector portion 122 can reflect radiation at the exact same angle as the incoming light beam, which is useful in situations where the communications are aligned (as will be discussed below) but not exactly at an angle perpendicular to the surface of the second FSO unit 104. It should also be appreciated that, although not illustrated, second FSO unit 104 can include second circuitry electrically connecting a second processor and second memory, the second processor and the second memory configured to execute and store, respectively, a second plurality of non-transitory computer-readable instructions to perform the functions of second FSO unit 104 as will be discussed herein. The second circuitry of second FSO unit 104 can be configured to sense, detect, or otherwise receive optical communication beam 108 and decode optical communication beam 108 into information or data.

In example embodiments, the first and second FSO units 102 and 104 can be mounted at elevated positions in any suitable outdoor structure, e.g., a streetlamp, to avoid the obstructions or interference between optical communication beam 108 and people, vehicles, etc. The term "streetlamp" or "streetlight" as used herein refers to any outdoor lighting infrastructure that includes a light fixture, e.g., a light fixture extending from a support such as a pole, in order to illuminate an area proximate to the streetlamp. The pole may be built specifically for the streetlamp, or may be used for some other purpose, e.g., a utility pole. It is to be appreciated that in other examples, one or more of the streetlamps may include or extend from other types of infrastructure, such as signage, buildings, bridges, towers or the like.

Advantageously, streetlamps, and buildings which are already electrically wired, can provide electrical power for building systems and/or light fixtures. These electrically wired buildings or fixtures can provide electrical connections for the first and second FSO units 102 and 104. Furthermore, streetlamps are commonly installed at regular intervals along a road, street, sidewalk, or other path, which extend to and/or between various locations where people reside, work, or otherwise desire high data rate communication. In this way, first and second FSO units 102 and 104 can be installed at streetlamps and a plurality of additional FSO units can form a connected network of FSO units, e.g., extending in any desired direction throughout all or part of a city, town, or other locations. Additionally, it is to be appreciated that existing streetlamp infrastructure can be leveraged by retrofitting the FSO units on existing streetlamps. It is also to be appreciated that one FSO unit can be mounted on a streetlight or streetlamp and the other can be mounted on a building, tower or other elevated structure.

As discussed above, one issue faced by free space optical systems is maintaining optical alignment or a direct optical path (e.g., the shortest straight path) between the first FSO unit 102 and the second FSO unit 104. In operation, the first FSO unit 102 and second FSO unit 104 are capable of moving relative to each other based on weather and other factors, e.g., wind sway, thermal expansion, and vibration. Because of the diameter D1 of the transmitted optical communication beam 108 and the limited field of view of the detector portion 120 at the second FSO unit 104, any slight movement due to any of these environmental conditions can affect beam alignment and interrupt communication. In some examples first FSO unit 102 and second FSO unit 104 are mounted on structures that are separated by significant distances, e.g., hundreds or thousands of meters, and any slight angular displacement in the beam path BP of optical communication beam 108 at first FSO unit 102 can cause significant misalignment proximate second FSO unit 104. Other environmental conditions, such as, fog can also interrupt communication even when the first and second FSO units 102 and 104 are not moving.

Thus, in one example, an object of the present disclosure to provide an optical system 100 that is configured to preemptively alter the beam path BP of optical communication beam 108 relative to alignment axis A in a repeatable predetermined motion 126 to detect the potential for future misalignment and correct for the potential future misalignment before any significant data is lost occurs. To that end, optical system 100 includes an alignment mechanism 124 configured to generate predetermined motion 126 on beam path BP of optical communication beam 108 relative to alignment axis A.

As illustrated in FIGS. 2A-3C, predetermined motion 126 can be a circular motion. FIG. 2A illustrates a series of beam path BP positions located on detector portion 120 of second FSO unit 104, and are illustrated as a series of dotted circles having diameter D1. It should be appreciated that although illustrated by a series of dotted circles, the circular predetermined motion 126 is intended to be a fluid circular motion and the dotted circles represent positions of optical communication beam 108 at different positions within the circular motion, e.g., every 40 degrees about alignment axis A. In other words, each dotted circle represents a snap shot of optical communication beam 108 at different points in time within the circular motion. Additionally, in one example, the circular predetermined motion 126 has a small radius, i.e., a radius that is less than half of diameter of detector portion 120, i.e., second diameter D2, such that all of the dotted circles, i.e., the entire circular path of optical communication beam 108, contacts detector portion 120 of second FSO unit 104 during the entire circular predetermined motion 126. As shown in FIG. 2B, should first FSO unit 102 and/or second FSO unit 104 experience and motion or vibration due to, e.g., environmental conditions, uneven heating of its support structure, etc., alignment axis A may begin to drift or become misaligned with respect to center C of detector portion 120.

As illustrated in FIG. 2B, first FSO unit 102 and/or second FSO unit 104 may begin to drift with respect to each other causing alignment axis A to drift, e.g., upward toward the top of detector portion 120. As illustrated, the drift may continue until at least a portion of optical communication beam 108 overlaps with and is reflected off reflector portion 122 of second FSO unit 104, and detected by unit detector 110 on first FSO unit 102 (illustrated by a dotted circle with cross-hatching). Due to the circular repeating pattern of predetermined motion 126 relative to alignment axis A, beam path BP will only momentarily overlap with reflective portion 122 of second FSO unit 104 and will automatically return to full contact with detector portion 120 as a part of its circular path. Thus, only a small or insignificant amount of data, i.e., the data contained in the communications reflected back to detecting unit 108 may be lost. As at least a portion of optical communication beam 108 was reflected back and detected by unit detector 110 of first FSO unit 102, first FSO unit 102 can correct its potential future misalignment with second FSO unit 104 based on the trajectory of the reflected data and correct for the misalignment before the next complete circular motion. In other words, first FSO unit 102 may adjust (e.g., using alignment mechanism 124 discussed below) its position to offset for the drift experienced by optical system 100 such that alignment axis A is substantially in line with center C of detector portion 120.

Figure 3A:
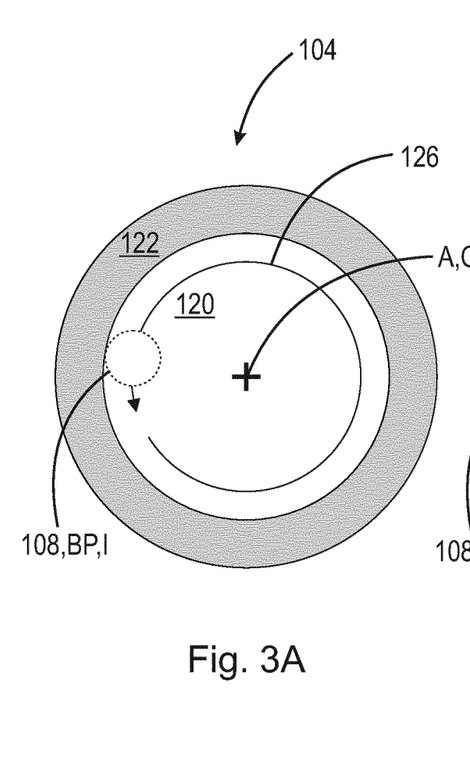
FIG. 3A is a schematic view of a receiving unit according to the present disclosure.
Figure 3B:
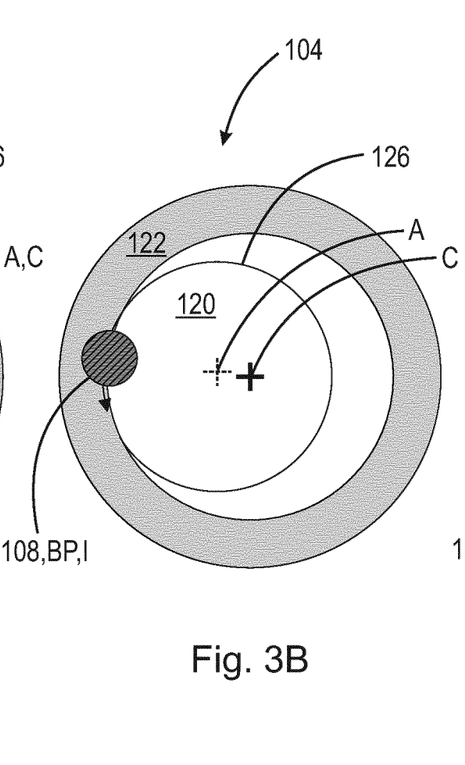
FIG. 3B is a schematic view of a receiving unit according to the present disclosure.
Figure 3C:
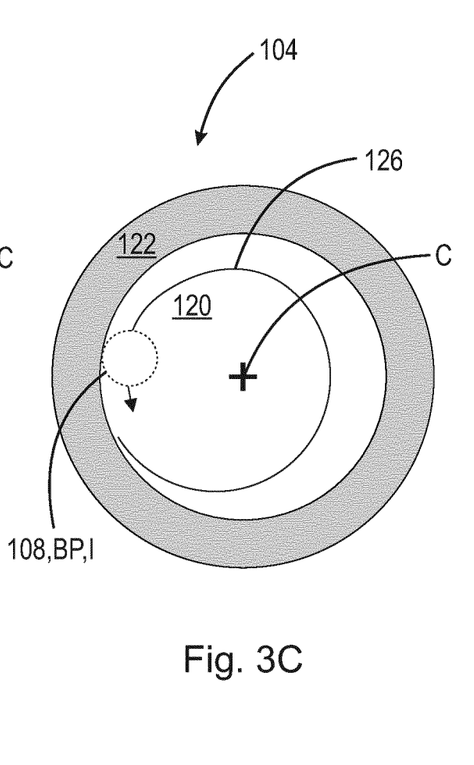
FIG. 3C is a schematic view of a receiving unit according to the present disclosure.

FIGS. 3A-3C illustrate a circular predetermined motion 126 with a larger radius, i.e., a radius that is slightly less than half of second diameter D2 (shown in FIG. 2A). In other words, when alignment axis A is lined up with center C of detector portion (shown in FIG. 3A), the circular path of optical communication beam 108 substantially traces the shape of the perimeter of detector portion 120 while maintaining that all portions of optical communication beam 108 are in contact with detector portion 120. In these examples, given the geometry of the circular motion illustrated, any drift between first FSO unit 102 and second FSO unit 104 will result in at least a portion of optical communication beam 108 overlapping with reflector portion 122 of second FSO unit 104 indicating a potential future misalignment as shown in FIG. 3B. Once the portion of the optical communication beam 108 is reflected back to unit detector 110 of first FSO unit 102, a preemptive correction can be made (e.g., using alignment mechanism 124 discussed below), to bring alignment axis A back into line with center C of detector portion 120 of second FSO unit 104 (shown by a deviation in the circular path in FIG. 3C).

Figure 4A:
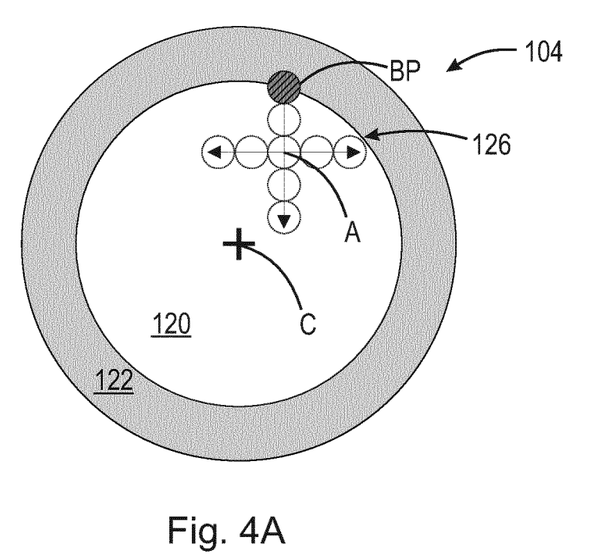
FIG. 4A is a schematic view of a receiving unit according to the present disclosure.

It should be appreciated that predetermined motion 126 can be any repeating motion, e.g., a translational reciprocating motion (discussed below), a circular motion (discussed above), a square-shaped motion (i.e., where the projected path of optical communication beam 108 on any portion of second FSO unit 104 is substantially square shaped), a triangular motion, rectangular motion, hexagonal motion, octagonal motion, or any other repeating motion. For example, as shown in FIG. 4A, predetermined motion 126 is a reciprocating motion, i.e., a back-and-forth translational motion. It should be appreciated that the reciprocating motion can be a vertical translational motion, i.e., up and down with respect to alignment axis A; a horizontal translational motion, i.e., left-to-right or right-to-left motion with respect to alignment axis A; or any reciprocating translational motion between those motions, e.g., a diagonal motion with respect to alignment axis A. It should also be appreciated that compound motions of any of the motions discussed herein are possible, e.g., where a first part of the reciprocating predetermined motion 126 is a vertical translational motion and a second part of the reciprocating predetermined motion 126 is a horizontal translational motion. Additionally, predetermined motion 126 can be adapted in real-time to the misalignment detected by optical system 100. For example, when the system detects misalignment of beam path BP as a substantially horizontal misalignment, the predetermined motion 126 can be selected as an elliptical motion with its longest axis in the horizontal plane. It should be appreciated that the misalignment experienced can be caused by a combination of motions occurring at the first FSO unit 102 and the second FSO unit 104. In these examples, motion of either the first FSO unit 102 and the second FSO unit 104 could be determined by an inertial measurement unit, which can include an accelerometer, gyroscope, and/or a magnetometer.

Similarly to the example described above using a circular motion, first FSO unit 102 and/or second FSO unit 104 may begin to drift with respect to each other causing alignment axis A to drift, e.g., upward and to the right side of detector portion 120 (shown in FIG. 4A). As illustrated, the drift may continue until at least a portion of optical communication beam 108 overlaps with and is reflected off reflector portion 122 of second FSO unit 104 and detected by unit detector 110 on first FSO unit 102 (illustrated by a dotted circle with cross-hatching). Due to the reciprocating pattern of predetermined motion 126 relative to alignment axis A, beam path BP will only momentarily overlap with reflective portion 122 of second FSO unit 104 and will automatically return to full contact with detector portion 120 as a part of its reciprocating motion. Thus, in some extreme cases, only a small or insignificant amount of data, i.e., the data contained in the communications reflected back to unit detector 110 may be lost. As at least a portion of optical communication beam 108 was reflected back and detected by unit detector 110 of first FSO unit 102, first FSO unit 102 can correct its potential future misalignment with second FSO unit 104 based on the trajectory of the reflected data and correct for the misalignment before the next complete reciprocating motion. In other words, first FSO unit 102 may adjust (e.g., using alignment mechanism 124 discussed below) its position to offset for the drift experienced by optical system 100 such that alignment axis A is substantially in line with center C of detector portion 120.

Figure 4B:
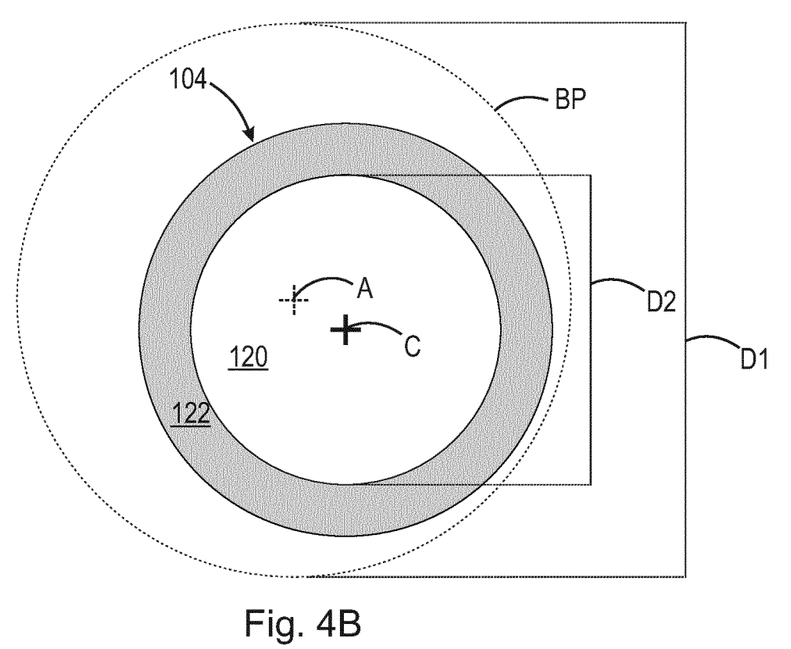
FIG. 4B is a schematic view of a receiving unit according to the present disclosure.

As illustrated in FIG. 4B, first diameter D1 of optical communication beam 108 can be larger than second diameter D2 of detector portion 120 of second FSO unit 104. In this example, rather than measure misalignment due to any portion of optical communication beam 108 contacting and being reflected off of reflector portion 122 of second FSO unit 104, misalignment can be determined as a function of intensity I of optical communication beam 108. For example, as discussed above, optical communication beam 108 can have an intensity I that degrades radially from the center of the beam to the outer edges of the beam. In some examples, the luminous intensity I across the width of a cross-section of optical communication beam 108 resembles a Gaussian distribution curve, Gaussian intensity profile (i.e., an intensity profile with a Gaussian distribution), with peak intensity located at the center of the beam and where intensity I degrades or decreases as 1/distance as you approach the outer edges of the beam. Given this intensity distribution, the alignment axis A, when no predetermined motion 126 is applied to beam path BP, will be coincident with the area of highest intensity, I as detected by detector portion 120 of second FSO unit 104. Inversely, misalignment can be determined from the intensity of the reflected portions of optical communication beam 108 that reflect off of reflector portion 122 of second FSO unit 104 and are detected by unit detector 110 of first FSO unit 102. For example, after predetermined motion 126 is applied to beam path BP relative to alignment axis A, any drift between first FSO unit 102 and second FSO unit 104 can be determined if any portion of optical communication beam 108 that is reflected off reflector portion 122 has an intensity I that meets a predetermined threshold. In one example, this threshold is 10% of the peak intensity I of optical communication beam 108; however it should be appreciated that other intensity thresholds are contemplated, e.g., 1%, 2%, 5%, 7%, 15%, 20% etc.

Figure 5A:
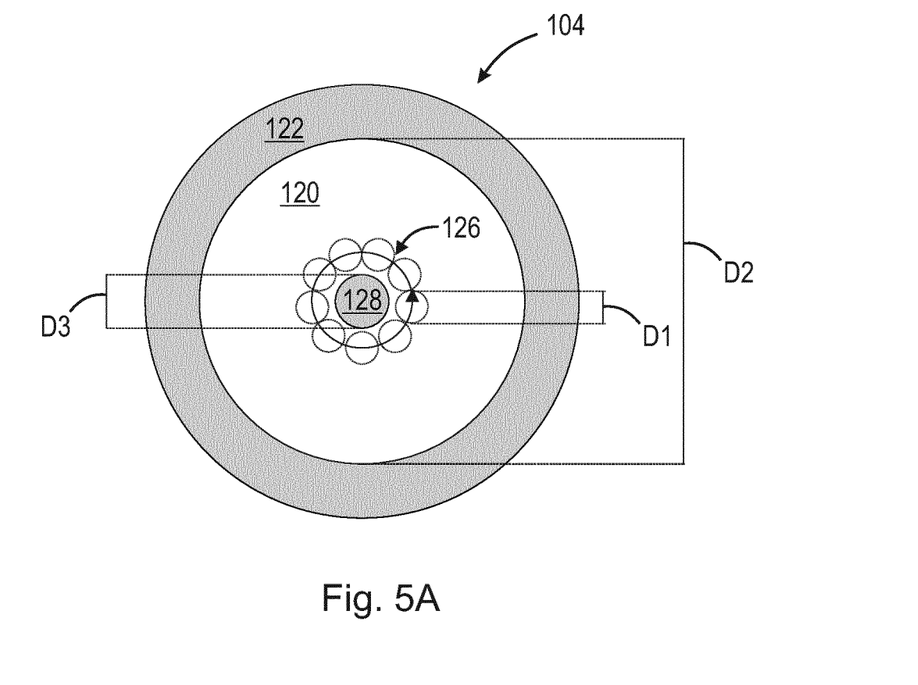
FIG. 5A is a schematic view of a receiving unit according to the present disclosure.
Figure 5B:
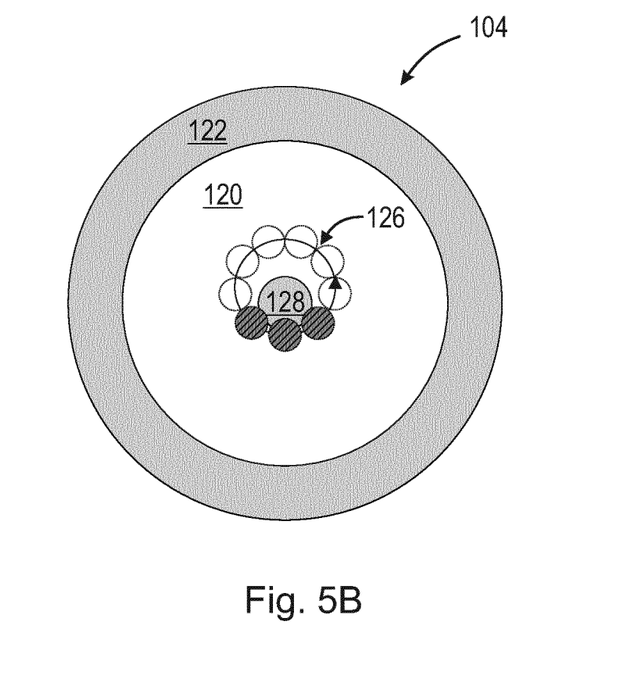
FIG. 5B is a schematic view of a receiving unit according to the present disclosure.

Additionally, as illustrated in FIGS. 5A-5B, detector portion 120 of second FSO unit 104 can further include a center reflector portion 128 centered within detector portion 120. Similarly to reflector portion 122 discussed above, center reflector portion 128 can include a passive reflective component or material or a plurality of passive reflective components or materials, e.g., mirrors or smooth coated surfaces with highly reflective properties. In the examples illustrated in FIGS. 5A-5B, center reflector portion 128 is circular shaped; however, it should be appreciated that other shapes, e.g., triangular, square, rectangular, hexagonal, octagonal, etc., may be utilized. In an aligned position, i.e., where alignment axis A is coincident with center C of detector portion 120, a predetermined motion 126, e.g., a circular motion, can be applied to beam path BP. In the example illustrated in FIG. 5A, the diameter of the center reflector portion 128, i.e., third diameter D3, is smaller than the diameter of the predetermined circular motion 126, such that, when in the aligned position, no portion of optical communication beam 108 overlaps any portion of center reflector portion 128. However, similarly to the drift corrections discussed above, in example embodiments where second FSO unit 104 includes center reflector portion 128, the contact position of alignment axis A as well as the contact portion of beam path BP can drift with respect to the center C of detector portion 120. As illustrated in FIG. 5B, an upward drift, i.e., a drift of alignment axis A toward the upper portion of detector portion 120, will cause a portion of optical communication beam 108 (illustrated as one or more dotted circles with cross-hatchings) to overlap with center reflector portion 128 which will be reflected back to unit detector 110 of first FSO unit 102 to signal that a potential future misalignment is imminent. As at least a portion of optical communication beam 108 was reflected back and detected by unit detector 110 of first FSO unit 102, first FSO unit 102 can correct its potential future misalignment with second FSO unit 104 based on the trajectory of the reflected data and correct for the misalignment before the next complete circular motion. In other words, first FSO unit 102 may adjust (e.g., using alignment mechanism 124 discussed below) its position to offset for the drift experienced by optical system 100 such that alignment axis A is substantially in line with center C of detector portion 120. It should be appreciated that the use of center reflector portion 128 can be used in isolation to create this effect, i.e., only center reflector portion 128 may be necessary, and optical system 100 may employ the measurements, predetermined motions, and detect misalignment without the need to reflector portion 122 and only rely on center reflector portion 128 to determine any misalignment.

As illustrated in FIG. 6, predetermined motion 126 can be imparted by an alignment mechanism, i.e., alignment mechanism 124. As illustrated, at least a portion of alignment mechanism 124 is configured to secure to and/or encompass at least a portion of body 112 and/or external surface 114 of first FSO unit 102. In one example, alignment mechanism 124 includes a front support structure 130 and a rear support structure 132. Front support structure 130 may be a frame-type structure configured to at least partially encompass front portion 116 of body 112 of first FSO unit 102. Front support structure 130 may include a plurality of front support arms extending radially inward toward body 112 of first FSO unit 102 which are configured to attach to front portion 116 of body 112 to suspend front portion 116 in free space and potentially allow front portion 116 to pivot. Similarly, rear support structure 132 may be a frame-type structure configured to at least partially encompass rear portion 118 of body 112 of first FSO unit 102. Rear support structure 132 may include a plurality of rear support arms extending radially inward toward body 112 which are configured to attach to rear portion 118 of body 112 of first FSO unit 102 to suspend rear portion 118 in free space.

In some examples, each rear support arm can include a piezoelectric element, i.e., at least one piezoelectric actuator of a plurality of piezoelectric actuators 134A-134D. Each actuator, operating individually, can push or pull on each respective rear support arm and cause the rear portion 118 of body 112 to move proportionately, thus by activating one or more piezoelectric actuators of the plurality of piezoelectric actuators 134A-134D, each predetermined motion 126 discussed above can be realized. For example, activation of first piezoelectric actuator 134A can operate to push or displace rear portion 118 of first FSO unit 102 in a downward direction, i.e., toward third piezoelectric actuator 134C while first support structure 130 is configured to maintain the suspended position of first portion 116 of FSO unit. Thus, the downward motion of rear portion 118 and pivoting of body 112 about front support structure 130 will cause beam path BP to be emitted at an upward trajectory or angle and contact second FSO unit 104 at a position above alignment axis A. Conversely, first piezoelectric actuator 134A can also be configured to pull or displace rear portion 118 in an upward direction causing beam path BP to be emitted at a downward trajectory or angle and contact second FSO unit 104 at a position below alignment axis A. It should be appreciated that all of the piezoelectric actuators 134A-134D may operate in a similar manner to push or pull rear portion to alter the trajectory of beam path BP horizontally or vertically relative to alignment axis A. Additionally, one or more piezoelectric actuators of the plurality of piezoelectric actuator 134A-134D can operate in concert to achieve one dimensional motion, e.g., an upward or downward motion. For example, downward displacement of rear portion 118 may be accomplished by a concerted activation of both first piezoelectric actuator 134A to push down on rear portion and third piezoelectric actuator 134C to pull down on rear portion 118. Furthermore, it should be appreciated that one or more piezoelectric actuators of the plurality of piezoelectric actuator 134A-134D can operate in concert to create more complex motions, e.g., circular motions, diagonally motions, or any of the other motions discussed herein. For example, each piezoelectric actuator of plurality of piezoelectric actuators 134A-134D can be remotely activated sequentially, i.e., starting with activation of first piezoelectric actuator 134A and proceeding to second piezoelectric actuator 134B, then third piezoelectric actuator 134C, and finally to fourth piezoelectric actuator 134D to induce a synchronized clockwise circular motion to rear portion 118 which in turn induces a clockwise circular motion to beam path BP. It should also be appreciated that although four piezoelectric actuators are shown and described herein, more or less piezoelectric actuators may be utilized to generate more complex motions, e.g., hexagonal, octagonal, etc. It should be appreciated that only the rear support structure 132 may be necessary to impart predetermined motion 126 and that front portion 116 may simply rest on or other otherwise engage a surface that allows body 112 to pivot about front portion 116. Moreover, in some examples, the front support structure 130 of front portion 116 can include the plurality of piezoelectric actuators 134A-134D to impart the predetermined motion 126 discussed herein and rear support structure 132 can be passive.

Furthermore, predetermined motion 126 can be imparted on beam path BP using one or more lenses or micro lenses, for example, as illustrated in FIG. 7 (which illustrates a partial cross-sectional view of first FSO unit 102), first FSO unit 102 may include a controller 136 and a miniature laser scanning module which includes at least one micro-electromechanical system (MEMS) device 138 to operate one or more mirrors or micro-lenses 140. Controller 136 can include a dedicated processor and memory configured to execute and store, respectively, a plurality of non-transitory computer-readable instructions to perform the functions of first FSO unit and/or alignment mechanism 124 as discussed herein. Controller 136 may be or may include one or more application specific integrated circuits or chips (ASIC) to direct MEMS device 138 to operate the mirror or micro-lens 140 to cause optical communication beam 108 to move in any of the motions discussed above relative to alignment axis A. In some examples, the MEMS mirrors are millimeter sized mirrors that perform laser scanning or in the transmitting portion of the solid state laser. Moreover, as illustrated in FIG. 7, first FSO unit 102 and/or second FSO unit 104 can include an inertial navigation system INS which can contain one or more processors, one or more motion sensors, and one or more rotation sensors, e.g., accelerometers, gyroscopes, magnetometers, that are configured to obtain each respective device's position, orientation, or movement velocity, if any. The inertial navigation system INS can be used by the devices within optical system 100 to determine the absolute or relative motion of first FSO unit 102 with respect to second FSO unit 104 and optical system 100 can adapt the predetermined motion 126 that is selected according to the known motion data provided by the inertial navigation system INS.

Figure 8:
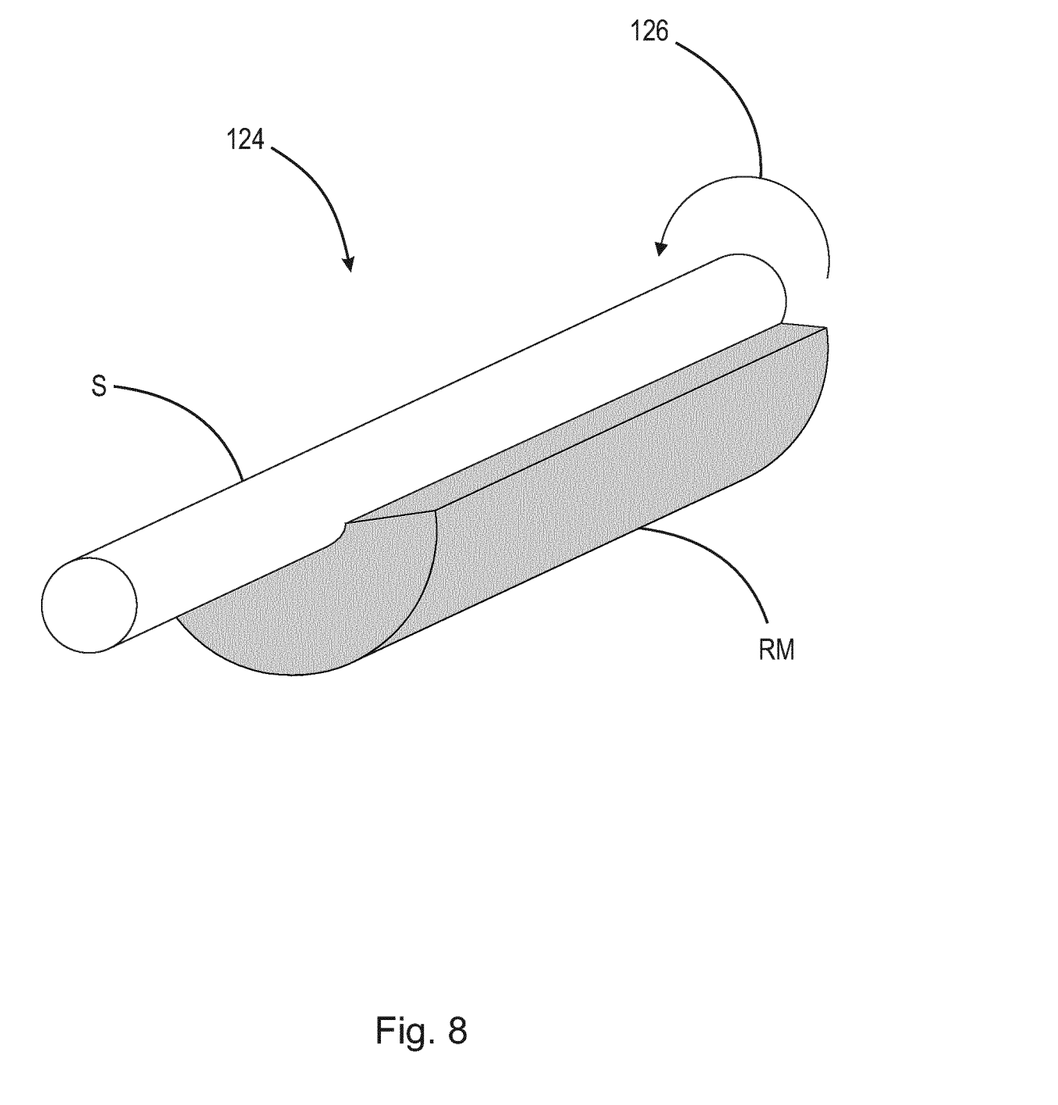
FIG. 8 is a schematic illustration of an alignment mechanism according to the present disclosure.

Additionally, as illustrated in FIG. 8, it should be appreciated that alignment mechanism 124, in addition to, or in the alternative to, the piezoelectric actuators and/or MEMS machines discussed herein, can include a movable or rotating mass RM positioned within first FSO unit 102 and connected to or attached directly to electromagnetic source 106 or positioned with second FSO unit 104 to produce predetermined motion 126. For example, a rotating shaft S may be provided within first FSO unit 102 which is non-rotationally secured to a mass RM that can take the shape of a half-cylinder, e.g., a cylindrical mass that has been cut parallel to the cylinder's long axis or its height axis. As the partial cylindrical mass RM rotates with the rotating shaft S, the uneven distribution of the mass in its rotation causes the shaft and structures attached to it to move slightly due to the impulse created. Given that the uneven distribution of mass caused by the partial cylindrical mass rotating about an axis, the impulse driven motions created will be circular motions, and therefore, the present application could utilize a rotating partial cylindrical mass RM to impart predetermined motion 126 in the form of a circular motion. It should be appreciated that this rotating mass can be provided within first FSO unit 102 and/or second FSU unit 104 to create the predetermined motion as will be discussed below.

Alternatively, or in addition to the foregoing, and although not illustrated, in some examples the functionality imparted by alignment mechanism 124 can be implemented on second FSO unit 104 rather than first FSO unit 102. For example, rather than generating a circular or translational predetermined motion 126 of optical communication beam 108 by imparting motion on body 112 of first FSO unit 102, FSO unit 102 may remain spatially fixed, while second FSO unit is displaced in a circular or translational pattern of motion. To that end, second FSO unit 104 may include a separate adjusting mechanism having, e.g., a plurality of piezoelectrical actuators to generate any of the predetermined motions 126 discussed herein relative to alignment axis A.

Figure 9:
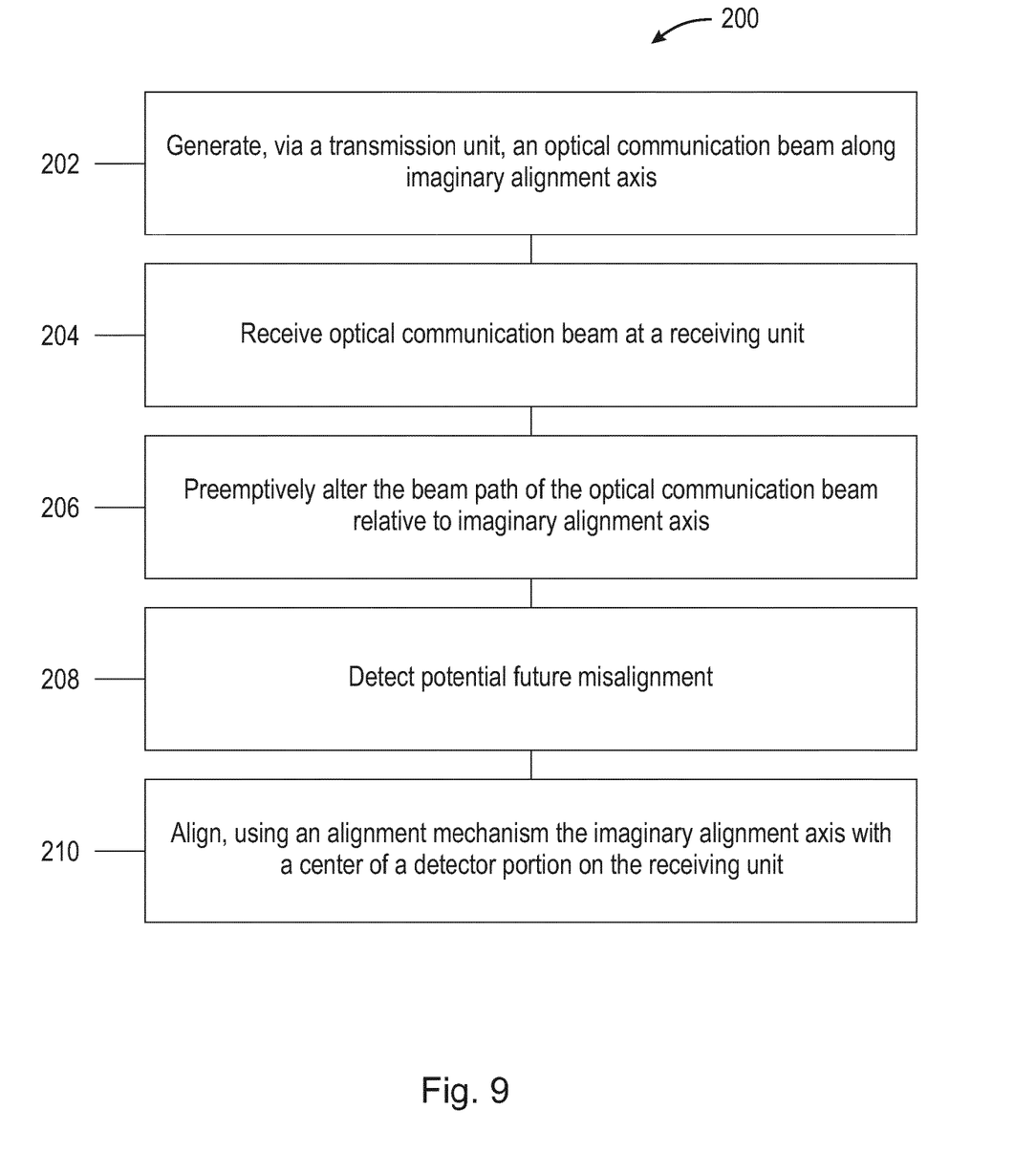
FIG. 9 is a flow chart illustrating the steps of a method according to the present disclosure.

FIG. 9 is a flow chart illustrating the steps of method 200 according to the present disclosure. Method 200 can include, for example, generating, via a transmission unit 102, an optical communication beam 108 along an imaginary alignment axis A, the transmission unit 102 comprising at least one unit detector 110, the optical communication beam 108 having a beam path BP between the transmission unit 102 and a receiving unit 104, the receiving unit 104 comprising at least one detector portion 120 and at least one reflector portion 122 (step 202); receiving at the at least one detector portion 120 of the receiving unit 104, the optical communication beam 108 (step 204); preemptively altering the beam path BP relative to the imaginary alignment axis A, using a predetermined motion 126 (step 206); detecting a potential misalignment of the imaginary alignment axis A when at least a portion of the optical communication beam 108 is received by the at least one unit detector 110 of the transmission unit 102 (step 208); and aligning, using an alignment mechanism 124, the imaginary alignment axis A relative to the center C of the at least one detector portion 120 based on the detected misalignment (step 210).

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of" or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of."

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The invention claimed is:

1. A method of maintaining alignment of an optical communication beam, the method comprising:
   generating, via a transmission unit, an optical communication beam along an imaginary alignment axis, the transmission unit comprising at least one unit detector, the optical communication beam having a beam path (BP) between the transmission unit and a receiving unit, the receiving unit comprising at least one detector portion and at least one reflector portion surrounding the at least one detector portion;
   receiving at the at least one detector portion of the receiving unit, the optical communication beam;
   preemptively altering the beam path relative to the imaginary alignment axis, using a predetermined motion;
   detecting a potential misalignment of the imaginary alignment axis when at least a portion of the optical communication beam is received by the, at least one, unit detector of the transmission unit; and
   aligning, using an alignment mechanism, the imaginary alignment axis relative to the center of the at least one detector portion based on the detected misalignment.

2. The method of claim 1, wherein the predetermined motion is a circular motion or a reciprocating motion.

3. The method of claim 1, wherein the alignment mechanism comprises a plurality of piezoelectric actuators; and wherein the plurality of piezoelectric actuators are radially spaced about an external surface of a body of the transmission unit, where each piezoelectric actuator of the plurality of piezoelectric actuators is configured to connect with a portion of the body of the transmission and wherein the plurality of piezoelectric actuators are arranged about a rear portion of the transmission unit.

4. The method of claim 1, wherein the transmission unit comprises an inertial navigation system (INS) to obtain movement information of the transmission unit.

5. The method of claim 1, wherein the alignment mechanism comprises at least one micro-electromechanical machine (MEMS) that comprises a mirror or micro-lens; or wherein the alignment mechanism comprises a rotating mass.

6. The method of claim 1, wherein the at least one detector portion has a first diameter and the optical communication beam has a second diameter, wherein the first diameter is less than or equal to the second diameter.

7. The method of claim 1, wherein the receiving unit further comprises a center reflector portion.

8. An optical system for maintaining alignment of an optical communication beam, the system comprising:
- a transmission unit configured to generate an optical communication beam along an imaginary alignment axis, the transmission unit comprising at least one unit detector;
- a receiving unit comprising at least one detector portion and at least one reflector portion surrounding the at least one detector portion;
- an alignment mechanism configured to preemptively alter a beam path (BP) arranged between the transmission unit and the receiving unit, relative to the imaginary alignment axis using a predetermined motion; and
- a controller configured to detect at least a portion of the optical communication beam at the, at least one, unit detector and operate the alignment mechanism to preemptively align the imaginary alignment axis relative to a center of the at least one detector portion.

9. The optical system of claim 8, wherein the predetermined motion is a circular motion or a reciprocating motion.

10. The optical system of claim 8, wherein the alignment mechanism comprises a plurality of piezoelectric actuators, and wherein the plurality of piezoelectric actuators are radially spaced about an external surface of a rear portion of a body of the transmission unit, where each piezoelectric actuator of the plurality of piezoelectric actuators is configured to connect with a portion of the body of the transmission unit.

11. The optical system of claim 8, wherein the transmission unit comprises an inertial navigation system (INS) to obtain movement information of the transmission unit.

12. The optical system of claim 8, wherein the alignment mechanism comprises at least one micro-electromechanical machine (MEMS) that comprises a mirror or micro-lens; or wherein the alignment mechanism comprises a rotating mass.

13. The optical system of claim 8, wherein the at least one detector portion has a first diameter and the optical communication beam has a second diameter, wherein the first diameter is less than or equal to the second diameter.

14. The optical system of claim 8, wherein the receiving unit further comprises a center reflector portion.

15. The optical system of claim 8, wherein the transmission unit is a Light Fidelity (Li-Fi) transmitter and the receiving unit is a Li-Fi receiver.

\* \* \* \* \*